United States Patent [19]

Frink et al.

[11] Patent Number: 5,530,933
[45] Date of Patent: Jun. 25, 1996

[54] MULTIPROCESSOR SYSTEM FOR MAINTAINING CACHE COHERENCY BY CHECKING THE COHERENCY IN THE ORDER OF THE TRANSACTIONS BEING ISSUED ON THE BUS

[75] Inventors: Craig R. Frink, Chelmsford, Mass.; William R. Bryg, Saratoga; Kenneth K. Chan, San Jose, both of Calif.; Thomas R. Hotchkiss, Groton, Mass.; Robert D. Odineal, Roseville, Calif.; James B. Williams, Lowell; Michael L. Ziegler, Whitinsville, both of Mass.

[73] Assignee: Hewlett-Packard Company, Palo Alto, Calif.

[21] Appl. No.: 201,463

[22] Filed: Feb. 24, 1994

[51] Int. Cl.⁶ ............................ G06F 12/06
[52] U.S. Cl. .............. 395/468; 395/446; 395/448; 395/403; 364/228.3; 364/229.2; 364/238.4; 364/240.1; 364/243.4; 364/243.44; 364/264; 364/264.4; 364/264.7; 364/DIG. 1
[58] Field of Search ................ 395/425, 400, 395/200, 800, 325, 468, 403, 446, 448; 364/580, DIG. 2; 370/85.2, 85.1

[56] References Cited

U.S. PATENT DOCUMENTS

| 4,473,880 | 9/1984 | Budde et al. ............... 395/325 |
| 4,768,148 | 8/1988 | Keeley et al. ............... 395/425 |
| 5,081,622 | 1/1992 | Nassehi et al. ............... 370/85.2 |
| 5,345,578 | 9/1994 | Manasse ...................... 395/425 |
| 5,406,504 | 4/1995 | Denisco et al. ............... 364/580 |

FOREIGN PATENT DOCUMENTS

| 0349123 | 5/1989 | European Pat. Off. ........ G06F 12/08 |
| 0489556 | 11/1991 | European Pat. Off. ........ G06F 12/08 |

OTHER PUBLICATIONS

Litaize, et al., "Multiprocessors With A Serial Multiport Memory & A Pseudo Crossbar of Serial Links Used as Processor–Memory Switch", Dec. 1, 1989, Computer Architecture News, vol. 17, No. 6, pp. 8–21.

Primary Examiner—Meng-Ai An

[57] ABSTRACT

A coherency scheme of use with a system having a bus, a main memory, a main memory controller for accessing main memory in response to transactions received on the bus, and a set of processor modules coupled to the bus. Each processor module has a cache memory and is capable of transmitting coherent transactions on the bus to other processor modules and to the main memory controller. Each processor module detects coherent transactions issued on the bus and performs cache coherency checks for each of the coherent transactions. Each processor module has a coherency queue for storing all transactions issued on the bus and for performing coherency checks for the transactions in first-in, first-out order. When a module transmits a coherent transaction on a bus, it places its own transaction into its own coherency queue.

4 Claims, 2 Drawing Sheets

MULTIPROCESSOR SYSTEM FOR MAINTAINING CACHE COHERENCY BY CHECKING THE COHERENCY IN THE ORDER OF THE TRANSACTIONS BEING ISSUED ON THE BUS

FIELD OF THE INVENTION

The present invention relates to computer systems, and more particularly to shared memory multiprocessor computers in which one or more processors has a cache memory.

BACKGROUND OF THE INVENTION

Computer systems commonly have a plurality of components, such as processors, memory, and input/output devices, and a shared bus for transferring information among two or more of the components. The components commonly are coupled to the bus in the form of component modules, each of which may contain one or more processors, memory, and/or input/output devices. Information is transmitted on the bus among component modules during bus "cycles," each bus cycle being a period of time during which a module has control of the bus and is permitted to transfer, or drive, a limited quantity of information on the bus. The module having control of the bus during a given cycle is referred to as the bus owner.

Component modules generally communicate with one another via the bus in the form of "transactions" taking one or more cycles to complete, such as "read" and "write" transaction. For example, in a typical read transaction, a module will send signals on the bus to the main memory controller or another module identifying data that it needs to obtain and requesting that the identified data be sent to it. The responding module then processes the request and returns the data during one or more subsequent cycles. Many conventional buses accommodate "split transactions" in which a response need not immediately follow a request. For example, after a module initiates a read transaction, the module relinquishes control of the bus, allowing the bus to be used for other purposes until the responding module is ready to return the requested data. At that time, the responding module obtains control of the bus and sends the requested data to the requesting module.

In many computer systems, software running on the system is executed by two or more main processor modules that share a main memory. The main processors generally are coupled directly to the shared bus. The main memory generally is coupled to the bus through a main memory controller. If a processor is to read data from main memory or write data to main memory, it must communicate with the main memory controller. Systems of this type are often referred to as "shared memory multiprocessor" systems.

A processor module or input/output module may also have a cache memory, which stores frequently used data values for quick access by the module. Ordinarily, a cache memory stores both the frequently used data and the addresses where these data items are stored in main memory. When the module seeks data from an address in memory, it requests that data from its cache memory using the address associated with the data. The cache memory checks to see whether it holds data associated with that address. If so, it is possible for the cache memory to return the requested data directly to the processor. If the cache memory does not contain the desired information (i.e., if a "cache miss" occurs), a regular memory access ordinarily occurs. Cache memory is typically useful when main memory (generally RAM) accesses are slow compared to the microprocessor speed. Cache memory is faster than :main RAM memory.

In the case of a shared memory multi-processor system in which each processor has cache memory, the situation is somewhat more complex. In such a system, the data needed for a particular transaction may be stored in one or more cache memories, and/or in the main memory. The data in a cache memory may have been operated on by a processor, resulting in a value that is different from the value stored in main memory. It is generally necessary for software executing on the processors to utilize the most current values for data associated with particular addresses. Thus, whenever a processor seeks data that may have been used by other processors, it is necessary to implement a "cache coherency scheme," which is a process for making certain that data provided to processors is current.

In a typical coherency scheme, when data is requested by a module, each module having cache memory performs a "coherency check" of its cache memory to determine whether it has data associated with the requested address and reports the results of its coherency check. Each module also generally keeps track of and reports the status of the data stored in its cache memory in relation to the data associated with the same address stored in main memory and other cache memories. For example, a module may report that its data is "private" (i.e., the data is only available to that module) or that the data is "shared" (i.e., the data may reside in more than one cache memory at the same time). A module may also report whether its data is "clean" (i.e., the same as the data associated with the same address stored in main memory) or "dirty" (i.e., the data has been operated on after it was obtained). Ordinarily, only one private-dirty copy of data is permitted at any given time. A "coherent transaction" is any transaction, for example a memory read, that requires a check of all memories to determine the source of the data to be delivered to the requested processor.

Coherent transactions generally can be issued during any available bus cycle. Some modules, however, may be busy internally and unable to immediately perform a coherency check for the transaction and cache coherency checks may take several cycles to complete. To accommodate the rate at which coherent transactions can be issued, modules sometimes have a cache coherency queue for storing coherent transactions until a coherency check can be performed.

The results of the coherency checks performed by each module are analyzed and the most current data is provided to the module that requested the data. For example, if no cache memories have a copy of the requested data, the data will be supplied by main memory. If a module has a private-dirty copy, it generally will supply the data. When the data is supplied, each module typically updates the status of the data in its cache memory. For example, if a private-dirty copy of data is copied into main memory, it may become a clean copy.

Delays in the cache coherency hardware in the modules can cause ordering problems in multi-processor systems. As explained above, hardware must ensure that for any particular data request, the most up-to-date version of data is supplied. This can be difficult in a heavily pipelined system, since there is an inevitable delay in responding to transactions that have been issued on the bus.

One potential problem occurs if a module issues a coherent read of a particular data line at about the same time that a second module writes-back a dirty copy of the same line. Since the dirty copy is the most up-to-date, it should be supplied in response to the coherent read. However, if memory responds to the read before the write is executed, and the second module (i.e., the module writing-back the dirty copy of the line) does not detect the conflict when performing a coherency check because it already "gave up" the line, the original requestor would get incorrect "stale" data from memory. This "ordering" problem obviously can cause incorrect results when the processors operate on incorrect data.

Prior systems have avoided the above ordering problem using various techniques. Each prior technique has disadvantages. Some systems have only allowed a single coherent transaction to be issued at a time, and no new coherent transaction may be issued until all coherency reporting has been completed on the first coherent transaction. This technique ensures that transactions are processed in the appropriate order and that up-to-date data is supplied at the cost of decreasing usable bus bandwidth, thus limiting performance.

Other systems require that modules check outstanding transactions for potential conflicts before issuing a new transaction. For instance, before a processor could issue, a write-back of a cache line, the processor would check to make sure there were no outstanding coherent reads of the same line. This restriction also slows down potential transaction issue rate, thereby limiting performance, and increases complexity in the modules.

Accordingly, there is a need for a coherency scheme for a pipelined split transaction bus, that does not limit the rate that coherent transactions can be issued, and in which each module can process cache coherence checks at its own rate.

SUMMARY OF THE INVENTION

An object of the present invention is, therefore, to provide an improved ordered coherency scheme.

Another object of the present invention is to provide an ordered coherency scheme in which transaction ordering is based on the time of issuance of a transaction.

Still another object of the present invention is to provide an ordered coherency scheme that does not add excessive latency to coherent transactions.

Yet another object of the present invention is to provide an ordered coherency scheme that allows each module to respond to coherency checks at its own pace.

These and other objects of the present invention will become apparent to those skilled in the art from the following detailed description of the invention and preferred embodiments, the accompanying drawings, and the appended claims.

Broadly stated, the present invention encompasses an ordered coherency scheme. The coherency scheme is used with a system having a bus, a main memory, a main memory controller for accessing main memory in response to transactions received on the bus, and a plurality of processor modules coupled to the bus. Each processor module has a cache memory and is capable of transmitting coherent transactions on the bus to other processor modules and the main memory controller. Each processor module has means for detecting coherent transactions issued on the bus and for performing cache coherency checks for each of the coherent transactions. Each processor module has a coherency queue for storing all coherent transactions issued on the bus and performing coherency checks for the transactions stored in first-in first-out order.

When a module transmits a coherent transaction on the bus, it places its own transaction into its own coherency queue. Thus, each module processes coherent transactions in precisely the same order.

The memory controller checks recently issued cache writes against recently issued coherent reads, for potential conflicts, and reorders transactions as necessary to preserve a coherent image of memory.

DETAILED DESCRIPTION OF THE INVENTION AND PREFERRED EMBODIMENTS

Figure 1:
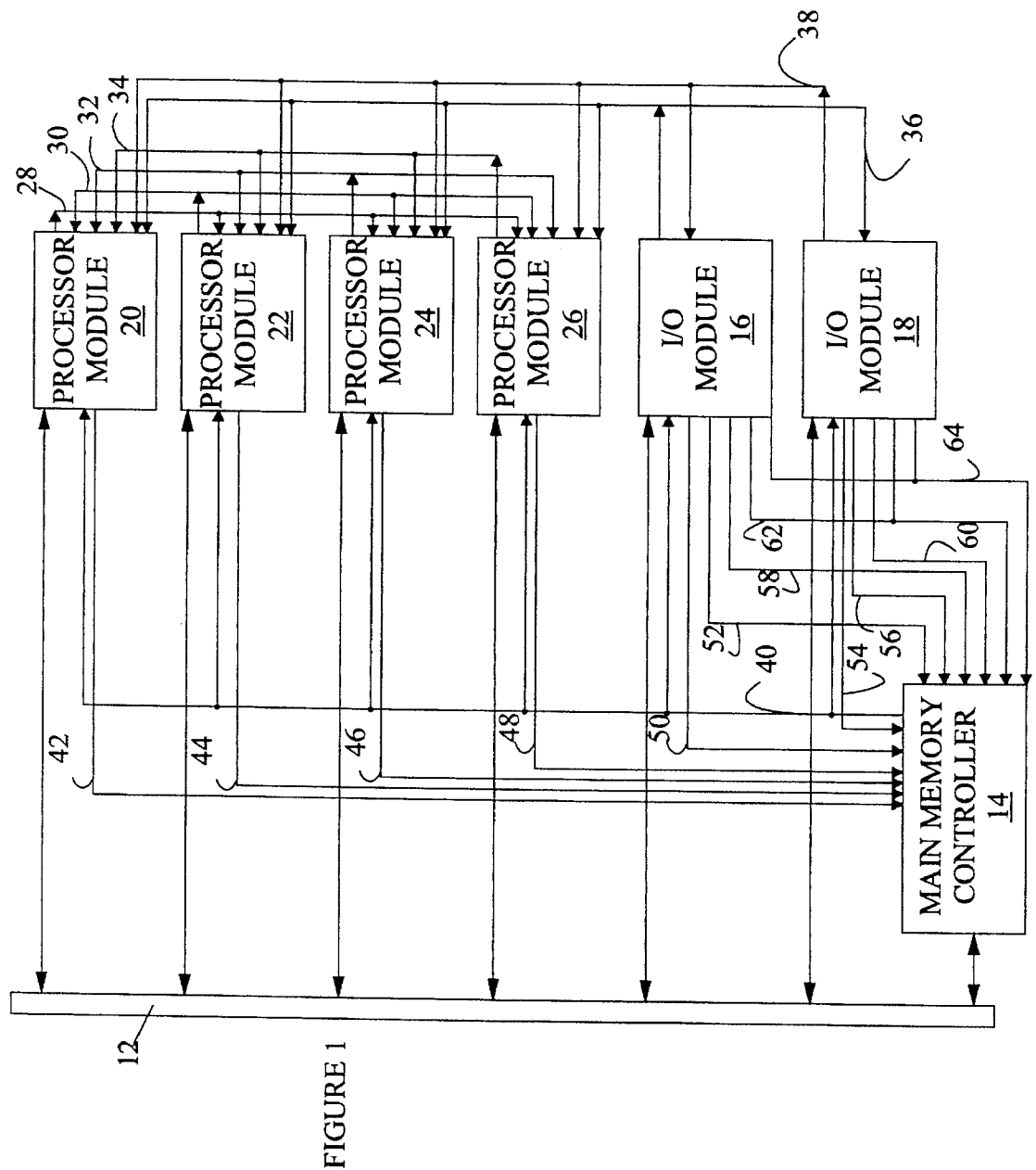
FIG. 1 is a block diagram illustrating one embodiment of a computer system utilizing a strongly ordered coherency scheme according to the present invention.

The present invention is based on the observation that ordering problems can be avoided by defining transaction ordering by the order in which transactions are issued on the bus, and by taking any necessary actions needed to preserve that definition. Module caches preserve the defined ordering by processing coherency checks and its own coherent transactions in the order in which the transactions were issued on the bus. Write-backs of previously held Private-Dirty cache data is also observed to be just changing the location of data within the coherent memory system, so cache write-backs are processed before any reads to the same location occurring at about the same time.

The present invention encompasses an ordered coherency scheme for use with a shared memory multiprocessor system in which one or more processors has a cache memory. Each module processes coherency checks for coherent transactions plus processes its own transactions in the order that the transactions are issued on the system bus.

Each processor or other component module having a cache memory has a cache coherency queue for storing coherent transactions that have been issued. When transactions are issued on the bus, each module having cache memory detects the transaction on the bus and places it in its cache coherency queue. Cache coherency checks on the transactions in the cache coherency queues are performed in first-in, first-out order. Each module is permitted to perform cache coherency checks at its own pace, and multiple cache coherency checks may be in progress at the same time. Each module sends the results of its cache coherency checks to the main memory controller, which provides the module issuing the transaction with the current data and coherency information.

To preserve ordering, each module issuing a coherent transaction places its own transaction in its own coherency queue. Thus, the module performs coherency checks on all previously issued coherent transactions before its own transaction is executed. Since each module places transactions issued on the bus into its coherency queue in the same order, each module will see transactions occurring in the same order.

The memory controller checks recently issued cache writes against recently issued coherent reads, for potential conflicts, and reorders transactions as necessary to preserve a coherent image of memory. If a cache write conflicts with an earlier coherent read transaction, the memory controller will reorder the cache write to be processed before the coherent read transaction, to ensure that main memory data is up-to-date before processing the read.

An ordered coherency scheme according to the present invention will be described in connection with an exemplary computer system 10. Before discussing the ordered coherency scheme, it is useful to understand the operation of computer system 10 in some detail.

Computer system 10 is a multiprocessor computer having a bus 12 and a plurality of components coupled to bus 12. The components include a main memory controller 14, input/output modules 16 and 18, and processor modules 20, 22, 24 and 26. The components send transactions to one another on bus 12.

As described more fully below, main memory controller 14 may be considered the "host" module and the remaining components may be considered "client modules." The main memory controller/host module sends client option signals to each client module specifying the types of transactions, if any, permitted on the bus during a given cycle. The bus owner during a given cycle can only initiate transactions of a type permitted by the client option signal governing that cycle. The bus owner during the next available cycle is also determined by arbitration based on the client option signals, along with arbitration signals from each of the client modules, and a signal sent by the current bus owner indicating whether it needs to retain control of the bus.

Processor modules 20, 22, 24 and 26 are the main processors for computer system 10, and software for the system executes simultaneously on all processors. Processor modules 20, 22, 24 and 26 control arbitration signal transmission (i.e., ARB) lines 28, 30, 32 and 34, respectively, which coupled each module to the remaining processor modules. When a processor wants to use bus 12, it sends a predetermined signal to the other processor modules on its ARB line, which is used for arbitration to determine the bus owner during the next available bus cycle.

Input/output modules 16 and 18 serve as interfaces between computer system 10 and input/output devices (not shown). Input/output modules 16 and 18 each contain an input/output adaptor. Input/output modules 16 and 18 control ARB lines 36 and 38, respectively. When an input/output module wants to use bus 12, it sends a predetermined signal to the remaining client modules on its ARB line, which is used for arbitration.

Main memory controller 14 is responsible for reading information from the main memory (not shown) and storing information in the main memory in a conventional manner. Main memory controller 14 interfaces with memory either directly or through a conventional bus. As noted above, main memory controller 14 preferably also serves as the host module for purposes of bus control. Main memory controller 14 controls a CLIENT_OP line 40, which is coupled directly to each client module. Main memory controller 14 sends signals to each client module on CLIENT_OP line 40 to indicate what types of transactions may be placed on bus 12 during the next available bus cycle.

Bus 12 is a high performance processor-memory-I/O interconnect bus. Bus 12 is a split transaction bus. For example, after a READ transaction is issued on bus 12, the module that issued the READ relinquishes the bus allowing other modules to use the bus for other transactions. When the requested data is available, the responding module for the READ arbitrates for the bus, and then transmits the data. WRITE transactions are not split, so the master transmits the WRITE data immediately following the address cycle.

Bus 12 preferably includes at least three buses that are primarily related to data transmission: an ADDR_DATA bus, a MASTER_ID bus, and a TRANS_ID bus. Bus 12 also includes a LONG_TRANS bus, which is related to arbitration for control of bus 12.

The ADDR_DATA bus is used for transmission of address information and data. Cycles where the ADDR_DATA bus carries address-related information are referred to as address cycles and cycles where the ADDR_DATA bus carries data is referred to as data cycles. Write transactions, for example, generally have a single address cycle followed immediately by one or more data cycles. The bus owner initiates a write transaction indicating the address to which it desires to write data and sends data during the succeeding cycles. Read transactions generally have a single address cycle used by the bus owner to indicate the address sought to be read. This address cycle is followed at some later time by one or more data cycles in which data is sent to the requesting module by the module responding to the request. Idle cycles may also occur in which no address-related information or data is sent.

The MASTER_ID and TRANS_ID buses are used together so that return data for a split transaction can be uniquely associated with the original transaction. Each split transaction "read" is identified by a MASTER_ID signal on the MASTER_ID bus and a TRANS_ID signal on the TRANS_ID bus that, respectively, identify the module issuing the transaction and distinguish the transaction from other transactions sent by that module. For example, a split transaction "read" is sent with a unique combination of a MASTER_ID signal and a TRANS_ID signal. The MASTER_ID and TRANS_ID then accompany the return of the requested data, so that the returned data is correlated with the appropriate transaction. This mechanism allows transaction returns to come back in an order other than the order in which they were issued, because the transaction order is not critical to identification of transactions. To allow unique identification, only one transaction with a given transaction ID may be outstanding from a module at a given time. The same transaction ID may, however, be used by two or more separate modules simultaneously, since the transaction can be differentiated by the MASTER_ID.

LONG_TRANS is used by the current bus owner to retain control of bus 12 until a long transaction is completed. For example, a module may need to write a large amount of data during a series of cycles. When LONG_TRANS is asserted, other transactions cannot be inserted into the middle of the data by higher priority clients or the host, as explained further below.

In a preferred embodiment, the CLIENT_OP bus supports the signals shown in Table 1.

TABLE 1

| Name | Value | Meaning |
| --- | --- | --- |
| SHAR_RTN | 000 | Host controls bus 12 for shared return during relevant cycle |
| HOST_CONTROL | 001 | Host controls bus 12 during relevant cycle |
| NONE_ALLOWED | 010 | No trans allowed during relevant cycle, |

TABLE 1-continued

| Name | Value | Meaning |
|---|---|---|
| | | but clients still control bus 12. |
| ONE_CYCLE | 011 | One cycle trans allowed during relevant cycle |
| RET_ONLY | 100 | Return or response transaction allowed during relevant cycle. |
| NO_IO | 101 | Any except I/O trans allowed during relevant cycle |
| ATOMIC | 110 | Client who is "atomic owner" can issue any transaction, other clients can issue only responses, during relevant cycle. |
| ANY_TRANS | 111 | Any transaction allowed at relevant cycle. |

The ANY_TRANS, HOST_CONTROL, ONE_CYCLE, and NONE_ALLOWED client option signals are relatively straightforward. A CLIENT_OP of ANY_TRANS indicates that any transaction is allowed during the relevant cycle. A CLIENT_OP of HOST_CONTROL indicates that the host seeks control of the bus during the relevant cycle. The ONE_CYCLE client option signal indicates that only a one-cycle transactions are allowed. The NONE_ALLOWED client option signal is used to indicate that no transactions are allowed.

The RET_ONLY client option signal indicates that only returns (writebacks) of previously held private-dirty cache lines, or responses to previous transactions are allowed. For example, if processor 24 issues a coherent read of a cache line that is private-dirty in processor 20's cache, processor 20 can supply that cache line in a cache-to-cache copy. That cache-to-cache copy transaction can be initiated under the influence of a RET_ONLY client option signal, since the cache-to-cache copy is a response to the coherent read. Similarly, I/O module 16 can return data from an earlier I/O read transaction under the influence of a RET ONLY client option signal, since the data return is a response to the I/O read transaction.

The NO_IO and ATOMIC client option signals relate to input/output modules 16 and 18. As shown in FIG. 1, input/output modules 16 and 18 preferably control STOP_IO lines 58 and 60, respectively, for sending signals to memory controller 14 indicating that the modules cannot accept any more input/output transactions. Input/output modules 16 and 18 also preferably control STOP_MOST lines 62 and 64, respectively, for sending signals to memory controller 14 and to each other to take effective control of the memory system.

When the host receives a STOP_IO signal. The host will then assert a NO_IO signal. If the CLIENT_OP is NO_IO, all transactions except I/O transactions are allowed. The ATOMIC client_op is generated in direct response to a client asserting STOP_MOST, assuming flow control would normally allow ANY_TRANS. The ATOMIC client_op allows the client asserting STOP_MOST to perform several consecutive transactions on bus 12. All other clients are only allowed to respond to earlier sent transactions or write-backs of previously held Private-Dirty cache lines if they obtain the bus during any cycle in which ATOMIC is asserted. The host may also ordinarily limit all clients to response-type transactions, such as returns of data to requesting modules and conventional write-backs of data, using the RET_ONLY client option signal. Thus, when there is an atomic owner, the effective client option signal for the atomic owner is ANY_TRANS and the effective client option signal for all other clients is RET_ONLY.

The SHAR_RTN client option signal is used in relation to coherency schemes for systems where each module has a cache memory. Each client module (both processor and input/output) has a cache memory and controls at least one coherent transaction signal transmission line (i.e., a COH lines) for sending signals directly to memory controller 14 that allow memory controller 14 to coordinate coherent transactions involving reads or writes of data that may be stored in one or more cache, memories, so that most current data is used by the processors. Processor modules 20, 22, 24 and 26 control COH lines 42, 44, 46 and 48, respectively. Input/output module 16 controls COH lines 50 and 52. Input/output module 18 controls COH lines 54 and 56. The SHAR_RTN signal indicates that the main memory controller will be returning data having a shared status.

Three main sets of transaction queues are used to handle typical transaction rates. Main memory controller 14 monitors the full/empty status of each of the queues and issues client option signals that prevent the queues from overflowing. The three types of queues used in computer system 10 are described below.

First, each input/output (I/O) module has an input/output queue, which holds transactions directed from bus 12 to the input/output module for transmission to an I/O device or an I/O bus. Processor reads and writes directed to I/O devices will wait in the I/O queue until the transaction can be processed on the I/O bus and/or I/O device. Such queues are commonly necessary to handle the rate at which transactions can be transmitted on bus 12. Typically, bus 12 will have a frequency of 60–120 MHz, while an I/O bus will have frequency of less than 20 MHz. Thus, transactions can be delivered to I/O modules much faster than they can be processed by the I/O bus or I/O device.

Second, main memory controller 14 has one or more memory queues for holding main memory read and write transactions. These memory-related transactions are stored in a memory queue until the read or write is performed in memory. Preferably, separate queues are used for reads and writes. A coherent read or write can not be performed until coherency checking is completed.

Finally, each module that has a cache memory, including both processor and input/output modules, has a cache coherency queue for storing coherent transactions in a first-in first-out ("FIFO") order. A coherent transaction is any transaction (such as a read) that results in the need to check other caches to see whether the requested data is in the other cache, or to verify that the cache is up-to-date. Such transactions are indicated by signals sent during the address cycle for the transactions initiated on bus 12. Each module having a cache memory monitors the bus and loads coherent transaction into its cache coherency queue, referred to herein as CCC queues. The coherent transactions wait in the CCC queue of a particular module until that module checks its cache, and reports the results of that coherency check to main memory controller 14. Main memory controller 14 waits until the results of the coherency checks are reported by all of the modules, and then responds to the coherent transaction. If no client module has a private-dirty copy of the data, main memory controller 14 will supply the data from main memory. Otherwise, the client module that has a private-dirty copy will supply the data and main memory controller 14 will update main memory with the new data value. This is performed in a single transaction. The address cycle for the transaction indicates to the requesting module that a cache to cache copy of data will follow. The main memory controller interprets the same address cycle as requiring a write to main memory. Thus, both the requesting module and the main memory controller obtain the data from the bus and behave accordingly. The MASTER_ID and TRANS_ID used with the address and data cycles are the same as in the original coherent read transaction so that the data cycles are identical to what they would be for a normal memory return.

Main memory controller 14 serves as a central location for receiving and processing information on the current full/empty status of all queues: the memory queues, the CCC queues, and the I/O queues. Different procedures are used to track each type of queue. With respect to its internal main memory queues, main memory controller 14 internally keeps track of how full its memory queues are. With respect to I/O queues, each I/O module reports the status of its I/O queue to main memory controller 14 by asserting a dedicated STOP_IO signal to main memory controller 14 when their I/O queues are critically full.

With respect to CCC queues, main memory controller 14 detects the number of coherent transactions issued on the bus and keeps track of how many coherent transactions each module has responded to, thereby indirectly monitoring the fullness of each module's CCC queue. More specifically, main memory controller 14 receives all coherent transactions as they are issued. As explained above, each module having a cache also receives each coherent transaction and sends the results of its cache coherency check for coherent transactions it has received to main memory controller 14. The responses are sent to main memory controller 14 on COH lines 42–52, which are dedicated buses from each module to main memory controller 14. Thus, main memory controller 14 can determine the number of coherent transactions remaining in a module's CCC queue by comparing cache coherency responses received from that module against the number of coherent transactions issued.

The process can be viewed as occurring on a "scoreboard." Coherent transactions are placed on the board when issued, indicating that the transaction is in each module's CCC queue. The main memory controller monitors the bus for such transactions. As main memory controller 14 receives the coherency response from each module on the COH lines, main memory controller 14 records the module's response and moves a pointer to the next CCC request to be processed by the module, and reduces by one the number of transactions listed as being in that module's CCC queue. Main memory controller 14 also knows when it has received all coherency responses for a given coherent transaction, so that it knows when to respond to the coherent transaction.

Based on the status of the various queues, main memory controller 14 uses the CLIENT_OP bus to prevent issuance of any transaction that would overload a queue. As explained above in connection with arbitration for bus 12, main memory controller 14, acting as host module, sends signals to all other modules on the CLIENT_OP bus indicating what types of transactions can be safely initiated. When a module wins arbitration for the bus, it checks what encoding was driven on the CLIENT_OP bus during the arbitration state to see what transactions (or returns) the arbitration winner can start.

Figure 2:
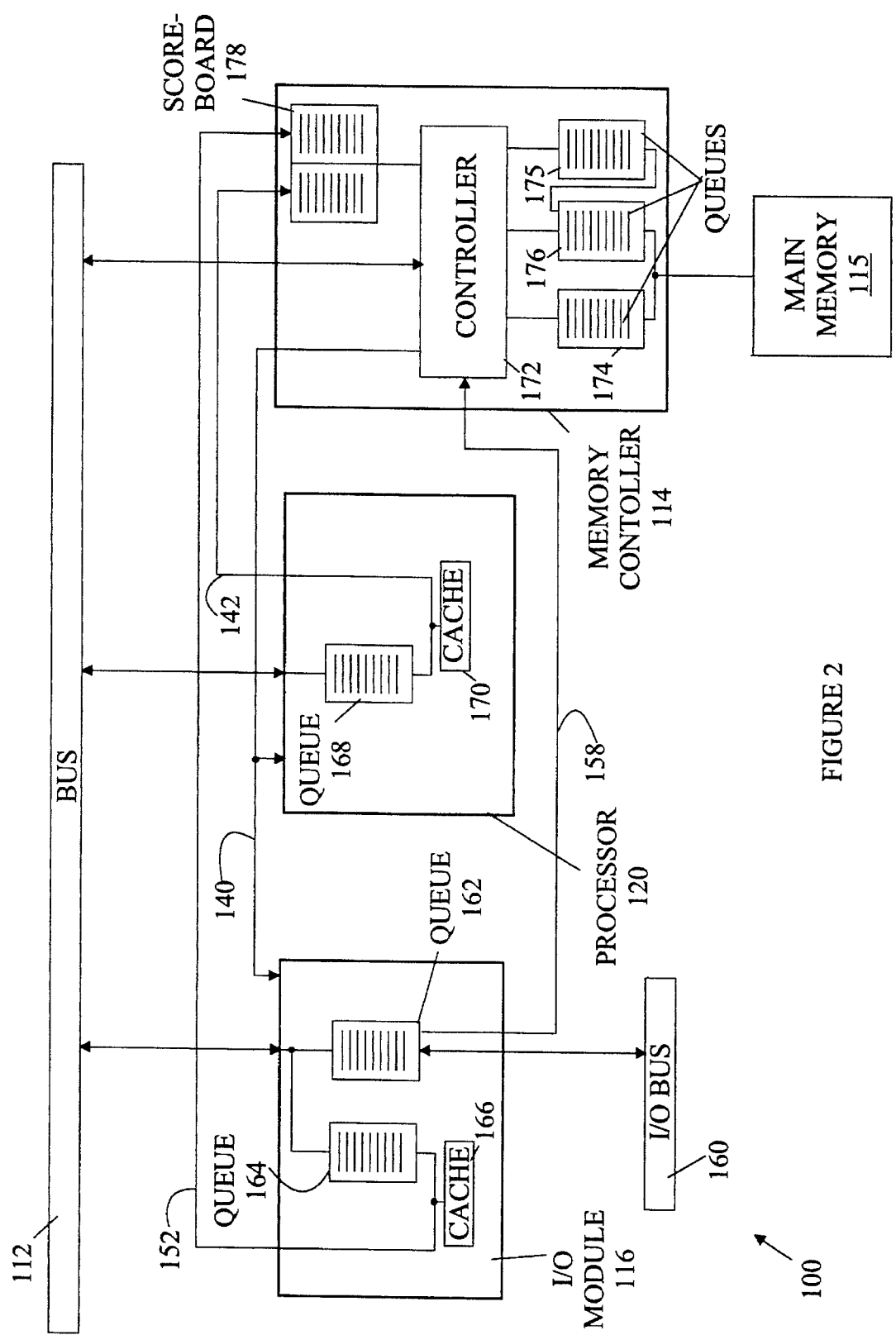
FIG. 2 is a block diagram illustrating components of a computer system utilizing a strongly ordered coherency scheme according to the present invention.

Referring now to FIG. 2, the operation of a computer system according to the present invention will be further described. FIG. 2 shows key elements of a computer system 100, which elements correspond functionally to elements described in connection with computer system 10 and FIG. 1. Computer system 100 comprises a bus 112, a main memory controller 114 coupled to main memory 115, an input/output module 116, a processor module 120, a CLIENT_OP line 140, coherency "COH" lines 142 and 152, and STOP_IO line 158. These elements correspond, respectively, to bus 12, main memory controller 14, input/output module 16, processor module 20, CLIENT_OP line 40, COH lines 42 and 52, and STOP_IO line 58, which were described in connection with FIG. 1. The aspects of these elements and their interrelationship that were described in connection with FIG. 1 will not be repeated here.

For clarity of explanation, FIG. 2 shows only one processor module and one input/output module. It is to be understood that additional processor modules identical to module 120 and additional input/output module identical to module 116 are coupled to bus 112 in the manner shown in FIG. 1.

Aside from those elements described in connection with FIG. 1, computer system 100 includes an input/output bus 160 coupled to input/output module 116 in a conventional manner. Input/output module 116 also includes an input/output queue 162, a CCC queue 164, and a memory cache 166. Processor module 120 additionally includes a CCC queue 168 and a memory cache 170. Main memory controller 114 includes a memory control processor 172, at least one memory queue 174 and a scoreboard 178. It is understood that the processor modules and input/output modules not shown each contain elements identical to those of processor module 120 and input/output module 116, respectively.

In operation, coherent transactions issued by an input/output module or processor module are transmitted on bus 112. The coherent transaction is detected by each module and placed in the CCC queue of each client module and on scoreboard 178. In FIFO order, coherent transactions stored in CCC queues 164 and 168 are checked against memory caches 166 and 170, respectively, and the results are reported to main memory controller 114 on lines 152 and 142, respectively. The results are stored on the scoreboard until all modules have reported for the transaction in question. Main memory controller 114 compares the number of coherent transactions responded to on lines 152 and 142 against the number of coherent transactions listed in scoreboard 178 to determine the full/empty status of CCC queues 164 and 168.

For example, a coherent memory read issued on bus 112 will be detected by modules 116 and 120 and placed in their CCC queue for a coherency check. The results of the coherency checks will be reported to main memory controller 114 indicating that neither module has a private dirty copy of the data. When all modules have reported, main memory controller 114 provides the requesting module with the data, and indicates on its scoreboard that each module has responded to that coherent transaction and marks this line of the scoreboard as being free for use by an incoming transaction.

Input/output transactions, such as a write to an input/output device are funneled through input/output queue 162 to input/output bus 160. Input/output module 116 monitors the status of input/output queue 162 and, when input/output queue 162 is critically full, input/output module 116 reports this information to main memory controlled 114 on line 158. For example, if processor module 20 is busy writing data to input/output module 116, transactions may fill up queue 162, causing issuance of a STOP_IO signal. Main memory controller 114 will issue a NO_IO client option signal.

Main memory controller 114 also monitors the status of its own memory queues. Thus, main memory controller 114 has information concerning the full/empty status of all queues within computer system 100. If it detects that its memory queues are critically full, it issues a NONE_ALLOWED client option signal. As the previously-issued memory transactions are processed, the memory queues will begin to empty and a more permissive client option signal can be issued.

More generally, based on the information available to main memory controller 114 on the full/empty status of all queues, memory control processor 172 within main memory controller 114 determines what types of transactions can be issued in the next available cycle without any of the queues overflowing. Memory control processor 172 determines which CLIENT_OP signal should be issued such that only transactions that will not cause any of the queues to overflow are permitted during the next available bus cycle. The winner of the arbitration will only issue transactions which are permitted by the CLIENT_OP signal. Thus, there is never a need to abort any transactions and there is no need for handshaking among modules.

For example, assume input/output queue 162 is close to becoming critically full. Input/output module 116 is busy receiving data. Another write to an input/output device is sent on bus 112 to input/output mode 116 and placed in input/output queue 162. Detecting that queue 162 is critically full, input/output module 116 sends a STOP_IO signal to main memory controller 114. Main memory controller 114 drives a NO_IO client option signal and the next bus owner will not drive any transactions to input/output devices.

As a further example, main memory controller 114 may detect (using its scoreboard) that one or more coherency queues is becoming critically full. Main memory controller 114 will drive a RET_ONLY client option signal. The bus owner will not drive any further read transactions. However, data returns and coherency check responses will be allowed. Thus, the CCC queues will eventually begin emptying, and a more permissive client option signal will be issued.

The ordered coherency scheme of the present invention will now be further described. As explained above, each coherent module having cache memory is required to perform a coherency check on its cache after the issuance of each coherent transaction on the bus. The modules, therefore, monitor the bus for coherent transactions. Coherent transactions issued on the bus are placed into the module's coherency queue, including the coherent transactions issued by that module. When some other module's transaction reaches the head of the coherency queue, the module performs a cache coherency check for that transaction, then reports cache coherency status for that transaction to the main memory controller on its COH lines. When a module's own transaction reaches the head of the coherency queue, the module updates its cache for issuing the transaction and marks the line to note that the data return is still pending. In addition, the module reports cache coherency status to the main memory controller on its COH lines, but always signals COH_OK (see below) to indicate that the check is completed and no conflict was found.

The main memory controller receives the separate cache coherency status reports to determine the complete cache coherency status for the coherent transaction request in a manner explained below.

The status of each cache line is defined in one of four ways: "Invalid", "Shared", "Private-Dirty", or "Private-Clean". A "Shared" line is one that is allowed to reside in more than one module's cache at the same time. By definition, all Shared lines are clean. Only one Private copy of a line is allowed in any data cache in the system at any time. A "Private" line may be either clean or dirty.

Coherency status is reported by each module on its COH line using the following signals, which are further explained below.

TABLE 2

| Result | [0007]Meaning |
|---|---|
| COH_OK | Coherency Check Done. |
| COH_SHARED | Coherency Check Done, mark line Shared. |
| COH_COPYOUT | Coherency Check Done, will supply data. |
| COH_NOP | No Coherency Status transmitted this cycle. |

Whenever a client is not actively reporting coherency status, the client drives COH_NOP on its COH bus. When the client is ready to give a coherency status report, it drives COH_SHARED, COH_COPYOUT, or COH_OK for a single bus cycle, depending on the results of its coherency check.

If the reporting module owns the requested data line Private-Dirty, and the coherent transaction was a read or a flush transaction, the reporting module will drive COH_COPYOUT to specify that it will provide the data to the requesting module in subsequent transaction on the bus. If a module sends COH_COPYOUT status, that module is required to write that line out.

If the reporting client has a Shared or Private-Clean copy of the requested line, and the reporting client will keep its copy of the line, the reporting client will drive COH_SHARED to specify that the requesting module should mark its copy as Shared. If the reporting module currently has a Private-Clean copy, it will mark its copy as shared. More than one client can transmit COH_SHARED status. In response, the main memory controller will notify the requesting module that the line should be marked Shared by using the SHAR_RTN encoding on the CLIENT_OP bus when the main memory controller arbitrates for the bus to return the data.

If the reporting client will not be supplying the line and is not keeping a Shared copy of the line, the client will drive COH_OK, indicating that it is done with the coherency check, and has nothing to report. COH_OK is issued if the reporting module does not have a copy, or if it will be marking its copy invalid as a result of the coherent transaction, or if the reporting module issued the coherent transaction.

The main memory controller keeps track of the coherency responses using the scoreboard described above. When each module has reported coherency status for a particular transaction, the main memory controller analyzes the signals and causes the most current data to be delivered to the requesting module. If no module has a private-dirty copy of the line, the main memory controller will supply the data, along with status about whether the data is available private or shared.

Otherwise, main memory can "forget" about this transaction since the module that has the Private-Dirty data will supply the data in a cache-to-cache copy transaction, where the transaction is treated by the main memory controller as a noncoherent cache write-back transaction, thus performing the necessary update of memory.

More than one coherency check can be in progress simultaneously. The number of simultaneous checks is limited only by the depths of CCC transaction queues which monitor the progress of coherent transactions.

As explained above, coherent transactions are detected on the bus as they are issued and are placed in each module's coherency queue for coherency checks in first-in first-out order. Each module also places its own transactions into its own queue as they are issued, and waits to perform a coherency check on its own transaction until it reaches the head of the queue. Each client, therefore, will transmit responses to coherency checks for each coherent transaction in the precisely the same order as the coherent transactions were issued on the bus.

The main memory controller waits until all coherency checks are completed (including the check by the module that issued the transaction) before it causes the data to be supplied. Thus, coherent transactions generally will be completed in the same order they are issued.

In the preferred embodiment, non-coherent writes to memory of Private-Dirty cache data are treated as a special case, where such writes are called cache write-backs. In addition to cache write-backs, the preferred embodiment recognizes the following classes of transactions: coherent reads, non-coherent reads, coherent writes, and non-cache non-coherent writes. The preferred embodiment uses a special transaction encoding to differentiate cache write-backs from regular noncoherent writes. In addition, the cache-to-cache copy transaction, described above, is treated as a cache write-back in its side-effect of updating memory with the dirty cache data. All transactions, other than cache write-backs, must be processed in the logical order in which they are issued on bus 112. Cache write-backs are special because of the pipelined and split transaction nature of the system. For example, processor 20 may issue a read to a certain address. Immediately after that, processor 22 may issue a cache write-back to the same address, but only after issuing the cache write-back does processor 22 perform the coherency check on processor 20's read. If cache write-backs were processed as other transactions, processor 22 would indicate that it did not have a copy of the data requested by 20 (since it was already written out to the bus), but main memory controller 114 would see that 20's read was on bus 112 before 22's write, and therefore execute the read first and return stale data from main memory.

To prevent this, in the event that a memory read is followed by a cache write-back to the same address, main memory controller 114 assumes that the data which is being written is in fact the data which should be returned to satisfy the read. Thus, the cache write-back is effectively reordered in front of the read. It will be apparent to those skilled in the art that an almost identical argument applies to the ordering of cache write-backs with respect to input/output DMA writes.

It will be appreciated that the time required to execute a read and return the requested data must be kept to a minimum since this has a direct impact on system performance. Writes, on the other hand, are not critical. As long as there is room to store the write, executing the write can be deferred in favor of the more critical reads until it is convenient, or until executing the write is necessary to preserve ordering.

For maximum performance (minimum read latency) a main memory controller 114 performs speculative execution of reads. When it receives a read request on bus 112, main memory controller 114 does not know yet if there will be a subsequent cache write-back to the same address, or if the read will be satisfied by a cache-to-cache copy from another cache. In fact, main memory controller 114 may have a write to the same address already queued up, but it does not take the time to check. In all of these cases, the read is sent to the memory as fast as possible. If it turns out subsequently that the data read from main memory was incorrect, then the data is discarded and, if necessary, re-read from memory.

Implementation of the above procedures for executing reads and cache write-backs is achieved with three FIFO memory queues in main memory controller 114: a primary queue (wait queue) 175, a secondary queue (ready queue) 176, and a read queue (normal read queue) 174, discussed above. All reads are entered in read queue 174. The transaction at the head of the read queue is issued to memory as soon as possible. All transactions other than noncoherent cache write-backs are entered in primary queue 175. Note that reads are entered in both read queue 174 and the primary queue 175. Cache write-backs are entered directly into secondary queue 176, thereby bypassing other reads and write-backs in the primary queue. As explained further below, this effectively causes cache write-backs to be ordered ahead of reads and DMA writes, even though the cache write may have been issued on bus 112 after the other transactions.

If the transaction at the head of the primary queue 175 is a read, then the corresponding data is returned on bus 112, provided the data is available and any required coherency checks have been completed, and also provided that the data is correct. The data may be incorrect if the read was executed in front of a write where the write contained the correct data.

Checking for stale data is accomplished as follows. Each time a write is issued to memory, its address is compared against the addresses of all reads which are present in the primary queue. If there is a match, a flag is set for that read indicating that it may receive stale data (because the read may have been previously issued to memory). Also whenever a read is at the head of the primary queue and is ready to return data on bus 112, its address is compared to the addresses of all the writes in the secondary queue. If there is any match, the read is assumed to have received stale data. In either case, the read must be reissued to memory. This reissue is accomplished by copying the read to the secondary queue, and then issuing all the transactions in the secondary queue (in order) to memory. By the time this reissue of the read is completed, all writes which should be logically ordered in front of the read will have already been issued to memory so that the correct data will be received for the read.

If the transaction at the head of the primary queue is a write (which is either a coherent write or a non-cache non-coherent write), then it is transferred from the primary queue to the secondary queue (again provided that any required coherency checks are complete.) Eventually the write will be issued to memory some time after it reaches the head of the secondary queue. This ensures ordering of noncoherent cache write-backs relative to other writes.

Various modifications to the present invention will become apparent to those skilled in the art from the foregoing description and accompanying drawings. Accordingly, the present invention is to be limited solely by the scope of the following claims.

What is claimed is:

1. A data processing system comprising:

a bus for transmitting and receiving information specifying transactions to be carried out by processing modules coupled to said bus;

a memory controller coupled to said bus for servicing transactions transmitted on said bus, said transactions being issued one at a time on said bus thereby defining an order for said transactions, said transactions comprising transactions requiring coherency checks prior to said memory controller servicing said transactions by causing data normally stored in a central memory connected to said memory controller to be placed on said bus, said data being identified by a memory address specifying a location in said central memory at which said data is stored; and a plurality of processing modules coupled to said bus, each of said processing modules comprising a coherency check means for performing a coherency check on data stored in a memory associated with that processing module and for reporting a result from said coherency check to said memory controller; wherein each of said coherency checks corresponds to a transaction issued on said bus, wherein said coherency checks are performed in said order of the transactions being issued on the bus, and wherein said memory controller waits until each of said coherency check means has reported before servicing one of said transactions requiring coherency checks.

2. The data processing system of claim 1, wherein each of said processing modules comprises a queue for storing information specifying coherency checks to be performed by said coherency check means included in that processing module.

3. The data processing system of claim 1 wherein each said processing module comprises means for detecting transactions on said bus requiring coherency checking and for initiating a coherency check in response to detecting one of said transactions requiring a coherency check.

4. The data processing system of claim 1, wherein said transactions serviced by said main memory controller comprise a read transaction that requests data from a specified memory address in said central memory and a write transaction that sends data to said specified memory address in said central memory, and wherein said main memory controller comprises means for causing said write transaction to be performed before said read transaction.

* * * * *